United States Patent [19]
Gretz et al.

[11] Patent Number: 4,967,126
[45] Date of Patent: Oct. 30, 1990

[54] METHOD OF CONTROLLING A SEVEN DEGREE OF FREEDOM MANIPULATOR ARM

[75] Inventors: Bruce D. Gretz, Philadelphia, Pa.; Scott W. Tilley, Belmont, Calif.

[73] Assignee: Ford Aerospace Corporation, Newport Beach, Calif.

[21] Appl. No.: 472,528

[22] Filed: Jan. 30, 1990

[51] Int. Cl.$^5$ .......................... B25J 9/06; G06F 15/46
[52] U.S. Cl. ............................... 318/568.19; 318/567; 318/571; 364/513; 364/163; 364/165; 901/9; 901/23
[58] Field of Search ................................. 318/560–640; 364/188–193, 474.9, 474.29–474.32, 513, 163, 165; 901/3, 6, 9, 2, 15–24

[56] References Cited

U.S. PATENT DOCUMENTS 4,808,063 2/1989 Haley ............................ 318/567 X
4,860,215 8/1989 Seraji .................................. 364/513

Primary Examiner—William M. Shoop, Jr.
Assistant Examiner—Paul Ip
Attorney, Agent, or Firm—Rosenblum, Parish & Bacigalupi

[57] ABSTRACT

The present invention is a control system for a seven-degree-of-freedom robotic arm. The robotic arm (10) includes two links (12 and 14), each having two degrees of freedom, and a spherical wrist (26) having three degrees of freedom. The kinematics of the spherical wrist are decoupled from the kinematics of the arm. The four degrees of freedom of the arm create a redundancy which provides versatility in the positioning of the arm. Fixing the redundant arm parameter and locating the end point (24) of the end effectuator path away from areas of limited mobility results in a marked simplification of the algorithms which describe the equations of motion of the arm. Additionally, further computation reduction can be achieved by updating the control gains less frequently than every microprocessor cycle, such as updating once for every five degrees of pitch angle rotation of either joint.

26 Claims, 6 Drawing Sheets

METHOD OF CONTROLLING A SEVEN DEGREE OF FREEDOM MANIPULATOR ARM

BACKGROUND OF THE INVENTION

1. Field of the Invention

The present invention relates to methods and algorithms for controlling robotic arms, and particularly to a method and algorithm for controlling a robotic arm having two links, a spherical wrist and seven degrees of freedom.

2. Brief Description of the Prior Art

Methods for controlling robotic systems, including robotic arms having several degrees of freedom, can involve the utilization of complex algorithms requiring large computerized resources for computation and control. This is particularly true for robotic arms that are configured for space applications, which involve many considerations not present in terrestrial applications. Safety and versatility are of prime importance in space applications. For example, safety concerns create a need for obstacle avoidance algorithms. Versatility demands may necessitate the manipulator's ability to perambulate between locations. Redundant manipulators meet these requirements because the additional degrees of freedom allow inclusion of obstacle avoidance algorithms and increase the maneuverability of the manipulator. The redundant joint configuration described in the present application consists of two links with identical two degree-of-freedom "shoulder" and "elbow" joints and a spherical "wrist" making a total of seven degrees of freedom. This particular joint geometry has favorable characteristics with respect to singularity avoidance, obstacle avoidance and simplicity. The present robotic arm utilizes a spherical wrist having three degrees of freedom, such that its kinematics are decoupled from the two links of the arm.

U.S. Pat. No. 4,794,547, issued Dec. 27, 1988 to Azusa Nishida, and U.S. Pat. No. 4,823,279, issued Apr. 18, 1989 to William Perzley et al., both depict a two link robotic arm having a wrist-like end effectuator engaged therewith. These patents present systems and algorithms for the manipulation of the robotic arm described therein. These inventions fail to achieve the versatility and simplicity of the present invention in that the end effector lacks three degrees of freedom and is therefore not decoupled from the two links of the arm. Additionally, the two links do not possess four degrees of freedom, whereby redundancy of motion is not achieved in the arm, and consequently the versatility of the present invention is not achieved. U.S. Pat. No. 4,772,831, issued Sept. 20, 1988 to Casler, Jr. et al.; U.S. Pat. No. 4,763,276, issued Aug. 9, 1988 to Perreirra et al.; and U.S. Pat. No. 4,680,519, issued July 14, 1987 to Chand et al., teach more generalized control systems for robotic arms having a plurality of links and/or joints.

U.S. Pat. No. 4,794,540, issued Dec. 27, 1988 to Gutman et al.; U.S. Pat. No. 4,725,942, issued Feb. 16, 1988 to Osuka; U.S. Pat. No. 4,672,564, issued June 9, 1987 to Egli et al.; U.S. Pat. No. 4,655,352, issued May 12, 1987 to Bartelt et al., each teach generalized control systems for robotic arms.

SUMMARY OF THE INVENTION

The present invention is a control system for a seven-degree-of-freedom robotic arm. The robotic arm (10) includes two links (12 and 14), each having two degrees of freedom, and a spherical wrist (26) having three degrees of freedom. The kinematics of the spherical wrist are decoupled from the kinematics of the arm. The four degrees of freedom of the arm create a redundancy which provides versatility in the positioning of the arm. Fixing the redundant arm parameter and locating the end point (24) of the end effectuator path away from areas of limited mobility results in a marked simplification of the equations of motion of the arm. Additionally, further computation reduction can be achieved by updating the control gains less frequently than every microprocessor cycle, such as updating once for every five degrees of pitch angle rotation of either joint.

It is an advantage of the present invention that the control of a seven-degree-of-freedom robotic arm is achieved with reduced computational effort.

There is another advantage of the present invention that it utilizes a end effectuator having three degrees of freedom whose kinematics are decoupled from the kinematics of the arm elements, such that control computation is reduced.

There is a further advantage of the present invention that the robotic arm includes a redundant degree of freedom such that versatility and obstacle avoidance are facilitated.

The foregoing and other features and advantages of the present invention will be apparent from the following detailed description of the preferred embodiment, which makes reference to the several figures of the drawing.

IN THE DRAWING

FIGS. 6a14 6c are graphics representation of the tip response with a payload, using the $\theta_3 = 0$ constraint.

DETAILED DESCRIPTION OF THE PREFERRED EMBODIMENT

Figure 1:
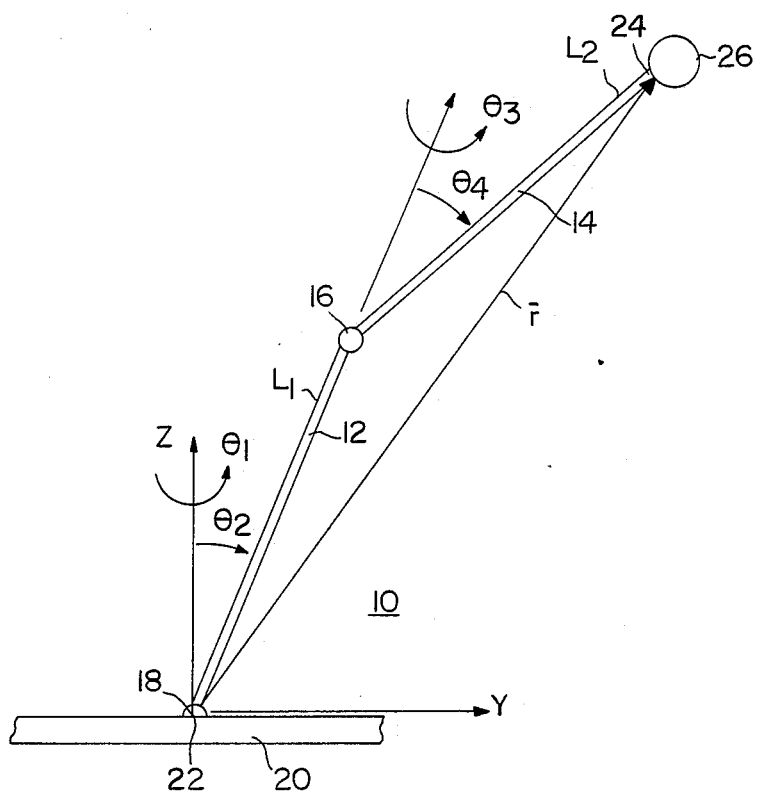
FIG. 1 is a schematic diagram of a manipulator arm in a reference position.

FIG. 1 depicts the manipulator arm configuration 10. The arm consists of two links 12 and 14 of length L1 and L2 respectively, connected by a two degree of freedom rotational joint 16 termed the "elbow joint". The base link 12 is attached to the ground 20 by an identical two degree of freedom rotational joint 18, termed the "shoulder joint", at a base point 22. Each joint 16 and 18 has one rotation axis parallel to the inboard link (roll axis) and one perpendicular to it (pitch axis). The shoulder roll axis is normal to the ground surface 20. The four joint angles are denoted $\theta_1$, $\theta_2$, $\theta_3$, and $\theta_4$ and are called shoulder roll, shoulder pitch, elbow roll, and elbow pitch, respectively. Joint angle limitations are not considered in this application.

The four joint angles provide four degrees of freedom in the shoulder and elbow joints, thus providing redundancy for positioning the manipulator tip 24. A three degree of freedom wrist 26 can then be used to orient an end effector. Assuming a spherical wrist, its kinematics are decoupled from those of the rest of the arm and are not treated in this application.

The forward kinematics of the arm 10 are easily solved using a variety of methods. In the present application, homogeneous transformation matrices derived from the Denavit-Hartenberg parameters were multiplied together to produce the vector r reaching from the base point 22 to the tip 24 (See Craig, J. J., "*Introduction to Robotics—Mechanics & Control,*" Addison-Wesley, 1986). The result is $$x = L_1 c_1 s_2 + L_2 (c_1 s_2 c_4 - s_1 s_3 s_4 + c_1 c_2 c_3 s_4)$$

$$y = L_1 s_1 s_2 + L_2 (s_1 s_2 c_4 + c_1 s_3 s_4 + s_1 c_2 c_3 s_4) \quad (1)$$

$$z = L_1 C_2 + L_2 (c_2 c_4 - s_2 c_3 s_4).$$

where $c_1$ denotes $\cos\theta_1$, $c_2$ denotes $\cos\theta_2$, $c_3$ denotes $\cos\theta_3$, $c_4$ denotes $\cos\theta_4$, $s_1$ denotes $\sin\theta_1$, $s_2$ denotes $\sin\theta_2$, $s_3$ denotes $\sin\theta_3$ and $s_4$ denotes $\sin\theta_4$.

As is well known, every redundant manipulator is capable of self-motion; that is, the tip can be fixed while the joint angles are varied. For the present manipulator arm 10, self-motion consists of "orbiting" the elbow joint 16 in a circle. During orbiting all four joint angles must change. In particular, the elbow roll angle varies from 0 degrees to 360 degrees. It follows that for a given tip position, an inverse kinematics solution can be found for any elbow roll angle. The same cannot be said for the other 3 degrees of freedom; therefore the elbow roll angle $\theta_3$ is the redundant joint. It is to be noted that for some tip positions, there exists a kinematic limitation on the elbow roll angle; this will be discussed hereinafter.

Specifying the tip position and elbow roll angle does not uniquely determine the other joint angles; there are still four possible solutions. These solutions determine one of two possible positions of the elbow joint 16 and one of two possible orientations of link 1. For example, if the tip lies in the xy-plane, see FIG. 1, then a point on the side of link 1 could "face" the z-axis or the xy-plane. Also, the elbow joint 16 may be above or below the xy-plane.

Figure 2:
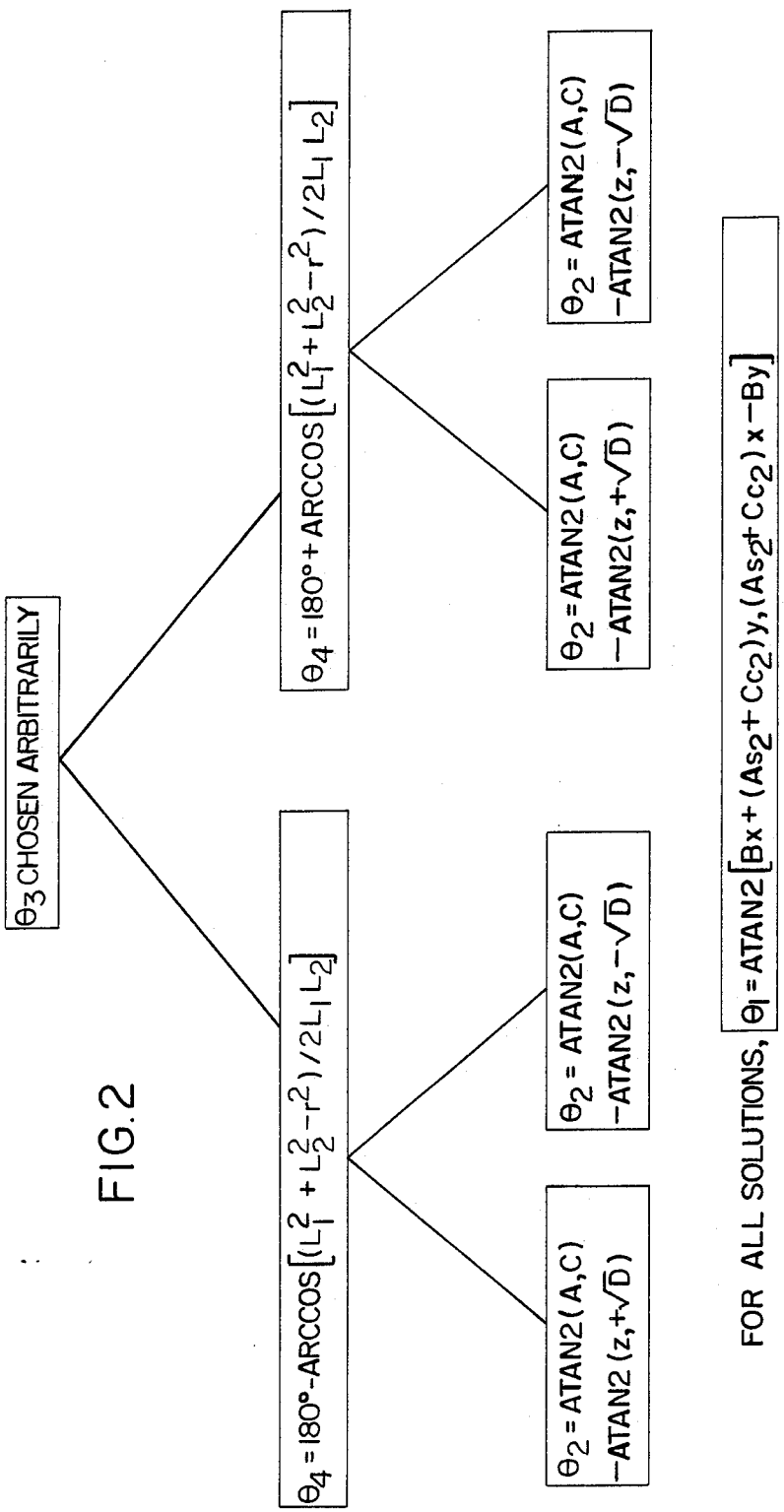
FIG. 2 is an inverse kinematics equation tree containing solutions of the four parameters describing arm movement.

FIG. 2 shows an inverse kinematics "tree" containing the equations for these four solutions. The first step in obtaining a solution is arbitrarily choosing the elbow roll angle, $\theta_3$. The elbow pitch angle, $\theta_4$, is found next by examining the triangle whose sides are the two links 12 and 14 and the vector from base to tip, r. Since all three sides are known, the angle between the links is easily computed. Its supplement is $\theta_4$. This solution has two values corresponding to the ambiguity in the sign of the inverse cosine. Physically, this corresponds to the elbow 16 bending "up" or "down" and determines one of the two possible elbow joint positions. Once one of these two configurations is chosen, the appropriate branch of the tree is selected. The shoulder pitch angle, $\theta_2$, is computed next. Its equation is found by manipulation of the forward kinematics equations. The mathematical significance of the comma within the parenthesis of the aTan function corresponds to a solution of the physical angle that corresponds to the physical quadrant in which the first link 12 is located. This notation is familiar to those skilled in the art. The sign ambiguity in this equation corresponds to link 1 facing "up" or "down". This choice of sign determines the final branch of the tree. The shoulder roll angle, $\theta_1$, is now determined.

It has been indicated hereinabove that for some tip positions, there is a kinematic limitation on self-motion, meaning that the elbow roll angle, $\theta_3$, cannot take on an arbitrary value. Mathematically, this limitation can be derived from the equation for $\theta_2$. If D, equal to $A^2 + C^2 - Z^2$, is less than zero, then no solution exists. This occurs when A and C are both "small". A is the length of the arm projected onto the vector parallel to link 1, so A decreases as the arm is folded onto itself. C is proportional to $\cos\theta_3$, thus it decreases as $\theta_3$ nears 90 degrees. From this qualitative analysis two results may be concluded: (1) When the arm is relatively far extended the elbow roll angle can take on any value and thus complete orbiting is possible, and (2) When the arm is folded towards itself the elbow roll angle must be near 0 degrees. Both of these conclusions can be restated rigorously. Assuming $L_1 = L_2 = L$, it can be shown that for tip positions lying outside of the volume defined by two spheres 30 and 32 centered at $z = \pm L$ and having radius L, the elbow roll angle, $\theta_3$, may take on any value. For tip positions lying inside of this volume, the elbow roll angle is constrained to $$|\theta_3| < \arccos\left( \sqrt{\frac{z^2 - (L_1 - \gamma L_2)^2}{L_2^2(1 - \gamma^2)}} \right), \quad (2)$$

where $\gamma \equiv (L_1^2 + L_2^2 - r^2)/(2L_1 L_2)$.

Figure 3:
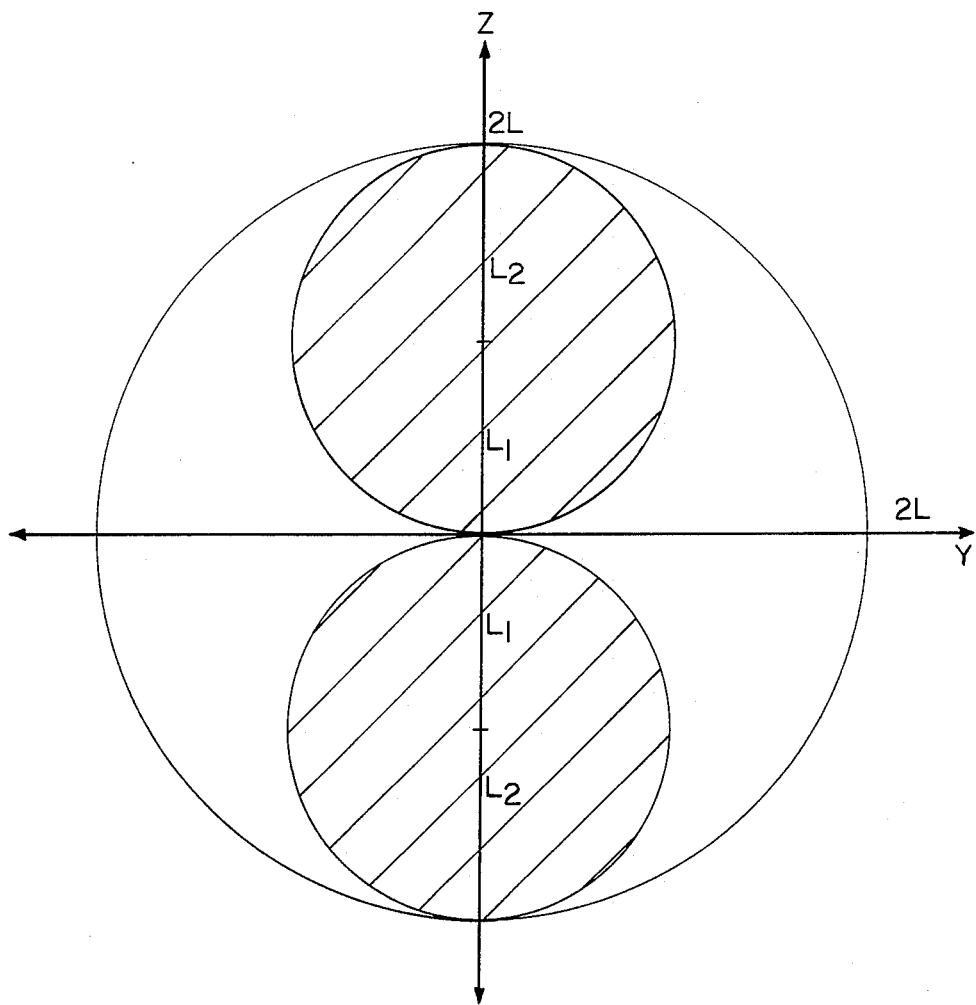
FIG. 3 is a depiction of the regions of limited orbit capability of the robotic arm of the present invention.

This range of angles is centered around $\theta_3 = 0$. FIG. 3 shows the regions 30 and 32 of limited orbit capability.

It is therefore to be realized that for maximum maneuverability, it is desirable to keep the workspace near the xy-plane.

The controller design for a space-based manipulator arm 10 is primarily driven by requirements to maintain a specified closed-loop bandwidth with a minimum of computational complexity. The bandwidth is specified to accurately follow commanded trajectories. Disturbance rejection and modeling error impacts will be discussed later. It is known that computed torque controllers, which use feed-forward, will provide good dynamic response throughout the workspace; however, their computational complexity may limit or preclude their use in space applications. The modal control algorithm of the present invention is designed to maintain a nearly constant closed-loop dynamic response with a minimum of computation.

As is well known, the equations of motion of any space manipulator take the form $$\tau_c = M(\Theta)\ddot{\Theta} + V(\Theta, \dot{\Theta}) + F(\Theta, \dot{\Theta}) - \tau_d, \quad (3)$$

where $\tau_c$ is the joint control torque, $\theta$ is a vector of joint angles, M is the mass matrix, and V is the nonlinear "velocity-squared" term of the dynamics, F is the friction terms, and $\tau_d$ is the joint disturbance torque arising from tip disturbance torques. For purposes of the present controller design, V and F are viewed as disturbance torques. Therefore, assuming the controller will be designed to have sufficient disturbance rejection and/or V and F are sufficiently small, the controller is designed based on the approximate equations of motion given by $$\tau_c = M(\Theta)\ddot{\Theta}. \quad (4)$$

If constant gain collocated joint control is applied to a manipulator the dynamic response varies widely throughout the workspace. Equation 4 shows that for slow motions this variation is primarily caused by the changes in the mass matrix as a function of $\theta$; that is, physically, the apparent inertia at each joint changes with arm geometry.

In the present invention the modal control algorithm applies collocated joint torques using feedback gains which vary with configuration in order to ensure a nearly constant closed-loop bandwidth throughout the workspace. The feedback gains are computed from the mass matrix as follows. The mass matrix M is always real positive definite and thus may be transformed such that $S^T M S = D$, where D is diagonal and $S^T S = I$. The simplified equations of motion (equation 4) then become $$S^T M S \ddot{\eta} = S^T \tau_c, \quad (5)$$

where $\eta \equiv S^T \Theta$. The elements of $\eta$ are called the modal coordinates. Equation 5 may be rewritten as $$D \ddot{\eta} = u, \quad (6)$$

where $u \equiv S^T \tau$ is the modal control torque. Placing the poles of this system using modal position and rate feedback is almost trivial because D is diagonal. Its diagonal elements are the modal inertias, denoted $\lambda_i$. The modal control torque thus takes the form $$u_1 = -(K_{p,i}\eta_i + K_{r,i}\dot{\eta}_i), \quad (7)$$

where $K_{p,i} = \lambda_i \omega_i^2$ and $K_{r,i} = 2\lambda_i \zeta_i \omega_i$ are the ith modal position and rate gains, respectively, which give the closed-loop poles associated with $\eta_i$ a damping of $\zeta_i$ and a frequency of $\omega_i$. The modal control torque may be transformed back into joint space to give the joint control torque as $$\tau_c = -Su = -S[K_p \ K_r]\begin{Bmatrix} \eta \\ \dot{\eta} \end{Bmatrix} = -S[K_p \ K_r]\begin{bmatrix} S^T & 0 \\ 0 & S^T \end{bmatrix}\begin{Bmatrix} \Theta \\ \dot{\Theta} \end{Bmatrix}, \quad (8)$$

where $K_p$ and $K_r$ are diagonal matrices containing the position and rate gains given in equation 7. The control torque may be rewritten as $$\tau_c = -[S K_p S^T \ S K_r S^T]\begin{Bmatrix} \Theta \\ \dot{\Theta} \end{Bmatrix}. \quad (9)$$

Since eigenvalues are preserved under a similarity transformation, the feedback scheme of equation 9 results in the same closed-loop poles that were assigned to the modal coordinates using equation 7. As a result, a constant dynamic response throughout the workspace is assured for sufficiently slow manipulator motions.

The choice of closed-loop frequency and damping is the result of hard requirements and engineering judgments. The requirements arise from desired tracking accuracy. This will be discussed later. The engineering judgments include considerations of disturbance rejection, positioning accuracy, tip force application, and noise sensitivity. Other factors which impact system stability and performance include structural flexibility, modeling errors, and time delays. Further, the control must be implemented on actuator/drive subsystems which contain their own dynamics (see Tilley, S. W., Emerick, K., Francis, C., and Hollars, M. G., "Preliminary Results on Noncollocated Torque Control of Space Robot Actuators", presented at the NASA Conference on Space Telerobotics, Pasadena, Calif., January 1989). These factors influence the choice of closed-loop pole location.

Implementing the algorithm described above requires diagonalization of the mass matrix and several matrix multiplications involving S. Much of this computation can be avoided by a restriction on the pole placement, namely, that each of the poles corresponding to the be placed at the same location. In this case, the position and rate gain matrices become $$K_p = D\omega^2$$

$$K_r = 2D\zeta\omega, \quad (10)$$

where $\zeta$ and $\omega$ are the damping and frequency, respectively, of that one pole location. As a result, equation 9 reduces to $$\tau_c = -[M\omega^2 \ 2M\zeta\omega]\begin{Bmatrix} \Theta \\ \dot{\Theta} \end{Bmatrix}. \quad (11)$$

The control gains can thus be computed simply by multiplying the mass matrix by a scalar. The restriction that all modal poles be placed at the same location is not unrealistic. For trajectory following, it is only necessary that their frequencies are sufficiently high and their damping is adequate.

Further computation reduction is achieved in the present invention by updating the control gains (the matrix of equation (9) less frequently than every microprocessor cycle. Thus the same control gains are used for several cycles even though the manipulator configuration is changing slightly. The gain computation can then be spread over several cycles with the gains being updated only after the computation is complete.

An analysis has been performed to determine how often these updates need to take place. The minimum gain update frequency depends on how fast the mass matrix is changing since the gains are computed from it. For the present manipulator 10, the mass matrix is most sensitive to the shoulder and elbow pitch angles. The shoulder pitch angle $\theta_2$ changes the apparent inertia about the shoulder joint roll axis because it moves the entire manipulator either closer or farther from that joint's axis. The elbow pitch angle folds the arm either in or out and thus changes the apparent inertia about both the shoulder joint roll axis and pitch axis. As a result, the gain update frequency should be set according to expected pitch angle rates for a given manipulator motion. It has been found from simulation that the gains should be updated no less than once every 5 degrees of pitch angle rotation of either $\theta_2$ or $\theta_4$. Such rotations change the terms in the inertia matrix by less than 10%, provided the arm is not fully extended.

Path planning for a redundant manipulator is achieved as follows. The problem in path planning is computing a tip-space position, velocity, and acceleration trajectory that moves the end effector from one point to another. A 5th-order spline has been chosen for this purpose because it can give zero velocity and acceleration at the end points. The solution is $$x(t) = x_i + (6\tau^5 - 15\tau^4 + 10\tau^3)(x_f - x_i), \quad (12)$$

where $x_i$ and $x_f$ are the initial and final positions and $\tau$ (defined as t/T) is normalized time with T the total maneuver time (see Hollars, M. G., "Experiments in End-Point Control of Manipulators with Elastic Drives", Stanford University PhD Thesis, May 1988). It can be shown that this spline also gives the minimum jerk for any polynomial trajectory. Hollars recommends that the controller have a bandwidth of at least 4/T Hz to adequately track this spline. The same spline is used for all three tip-space coordinates. As a result the trajectory is a straight line between the start and end points.

A further consideration in path planning is generating a joint-space trajectory corresponding to the desired tip-space trajectory. In the present case there is one redundant degree of freedom, therefore one additional constraint must be added in order to produce a solution. This constraint could arise from considerations of singularity avoidance, obstacle avoidance, tip-space stiffness, or other factors.

The present manipulator has no internal singularities within the region of complete orbit capability. Therefore, an easy singularity avoidance scheme consists of limiting the workspace to this region. A constraint still needs to be chosen to solve the inverse kinematics. The constraint $\theta_3$ is one simple possibility. This leaves four possible solutions for the other joint angles (see FIG. 2). A single one can be selected based on how the links are to be oriented during the motion (elbow "up" or "down", etc.). This choice could be driven by constraints on the position of the elbow itself arising from obstacle avoidance concerns.

Another possible constraint is minimizing joint velocities. This can be accomplished by resolved-rate control in which a desired tip velocity trajectory is transformed into a joint velocity trajectory. The Jacobean pseudo—inverse is used to find the instantaneous minimum joint velocity. The solution is $$\dot{\Theta}(t) = J^t \dot{X}(t), \quad (13)$$

where $\dot{X}(t)$ is the vector of tip-space coordinates and $J^t$ is the Jacobean pseudo-inverse given by $J^t = J^T(JJ^T)^{-1}$. This solution minimizes the 2-norm of the joint velocity vector at each point in the trajectory. Several modifications to this method have been proposed in the prior art (see Dubey, R. and Luh, J. Y. S., "Performance Measures and Their Improvement for Redundant Robots", presented at Winter Annual Meeting of ASME, Anaheim, Calif., from *Robotics: Theory and Applications.* DSC vol. 4, pp. 143-151, December 1896, and see Walker, Ian D. and Marcus, Steven I., "Subtask Performance by Redundancy Resolution for Redundant Robot Manipulators", Communication in *IEEE Journal of Robotics and Automation,* vol. 4, no. 3, pp. 350-354, June 1988. They generally attempt to optimize some other performance criterion or potential function.

One argument for using equation 13 is that it helps avoid singularities because joint velocities tend to increase near them. However, this method causes the tip to follow the desired trajectory exactly, therefore if the trajectory passes close to a singularity then the minimum joint velocity solution can be arbitrarily large. Wampler and Leifer (see Wampler II, C. W. and Leifer, L. J., "Applications of Damped Least-Squares Methods to Resolved-Rate and Resolved-Acceleration Control of Manipulators", *Journal of Dynamic Systems, Measurement, and Control,* vol. 110, pp. 31-38, March 1988) have proposed an interesting modification to this method which causes the tip to deviate from the desired trajectory when it approaches a singularity. In this way an upper bound on joint velocities can be maintained.

For the present invention, limiting the workspace to the region of complete orbit capability will avoid all internal singularities. If the manipulator is required to move out of this region then $\theta_3 = 0$ is the recommended constraint because it will avoid orbit angle limits. If the tip is always in this region then either $\theta_3 = 0$ or equation 13 gives acceptable results for simple pick-and-place operations. When constraints involving obstacle avoidance, elbow joint position, or tip stiffness arise, the redundancy can be used to address them.

Path planning in the presence of a tip payload requires still further considerations. Since we are designing a manipulator to perform pick-and-place operations, path planning with a tip payload is of concern. Clearly, executing a trajectory with a tip payload will require larger control torques than tracking the same trajectory without a payload. A nominal trajectory duration for movements without a payload should be selected such that the peak joint torque commanded is a certain fraction of the maximum joint torque. This nominal duration should be varied with trajectory distance in order to keep the average tip velocity constant. This will ensure that the velocity-squared terms and the inertia term of the equations of motion maintain the same relative magnitude (see equation 3).

When a payload is added, the nominal trajectory should be modified in order to ensure the same peak joint torque command. Using simple results from the dynamics of accelerating a point mass, we can assume that the maximum control torque required to execute a trajectory is inversely proportional to the square of the maneuver time. That is, $$\tau_{c,max} \, \alpha \, \frac{1}{T^2}, \quad (14)$$

where $T_{c,max}$ is the maximum control torque and T is the trajectory duration. The first step in modifying the trajectory is running a simulation to determine the peak joint torque commanded when moving the payload through the nominal trajectory duration. Equation 14 can then be used to adjust the maneuver time accordingly. Also, the desired closed-loop pole frequency should be lowered so that it is no higher than that required for tracking. This will minimize the sensitivity of the controller to noise and unmodeled dynamics.

The mass matrix used to compute the control gains should include modeling of the payload. If it does not then the closed-loop poles will have a lower frequency and damping than that desired. As a result, the disturbance and noise rejection may be degraded. Including modeling of the payload in the mass matrix will ensure that the desired closed-loop poles are achieved. Since space-based manipulators will initially be used in highly structured environments, the time of attachment and mass properties of payloads should be readily available.

Simulations of tip trajectory following with and without a payload using the modal control algorithm and two redundancy management schemes were performed with the following results. The starting and ending tip coordinates (in meters) in the x-y-z coordinate system of FIG. 1 are (−0.8,1.0,0.6) and (0.6,1.2,−0.8), respectively, giving a trajectory length of about 2 m. Note that the line connecting these points lies completely within the area of complete orbit capability. The control gains are updated every 0.25 sec and the payload is assumed to be a point mass of 100 kg located at the tip.

Figure 4C:
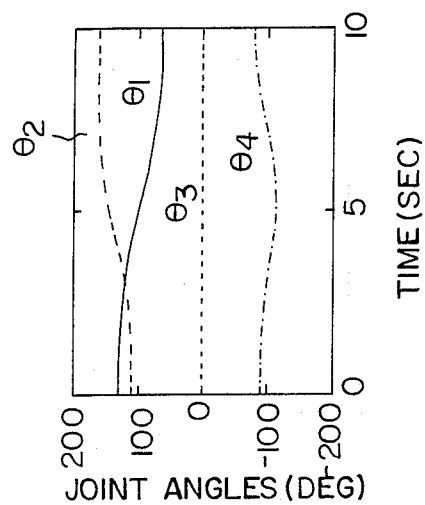
FIGS. 4a–4c are graphic representation of the tip response with no payload, using the $\theta_3 = 0$ constraint.
Figure 4B:
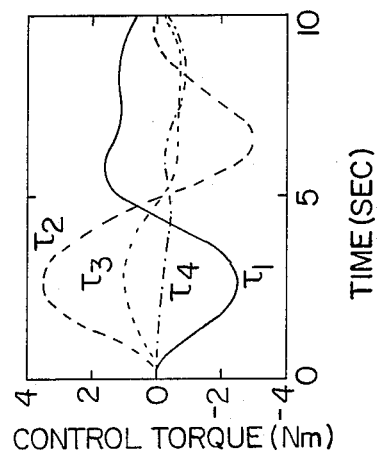
Figure 4A:
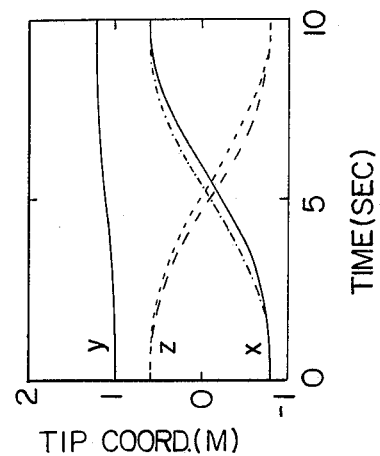

FIGS. 4a–4c show the response with no payload using the $\theta_3=0$ constraint. All closed-loop pole frequencies are set of 2.4 rad/sec, which is the minimum required for a 10 sec slew. In the first plot the actual and commanded tip motion are shown. Although the actual tip motion lags slightly behind the desired trajectory, it converges accurately to the desired end position at the end of the maneuver. Note that the discrete gain updating causes jumps in the commanded joint torques. Since joint dynamics are not modeled here, the commanded torque is equal to the applied torque. In actuality, the dynamics of the joint motor will smooth these jumps while not degrading the tracking accuracy.

Figure 5C:
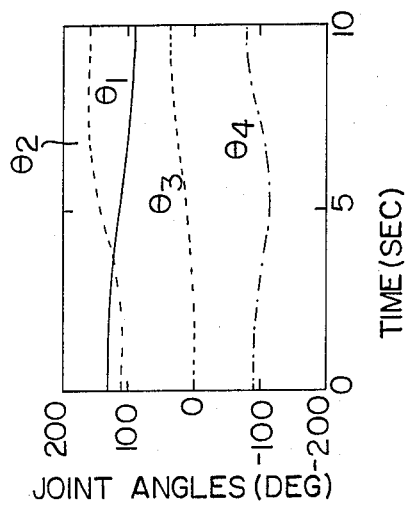
FIGS. 5a–5c are graphics representation of the tip response with no payload, using the constraint of minimizing the joint velocities.
Figure 5B:
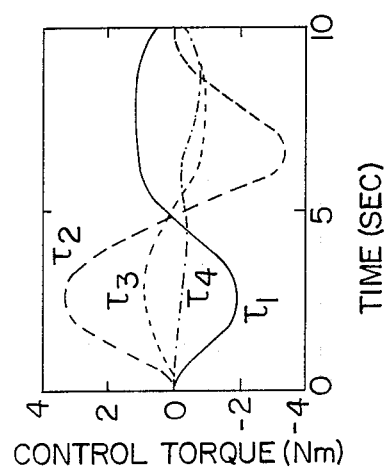
Figure 5A:
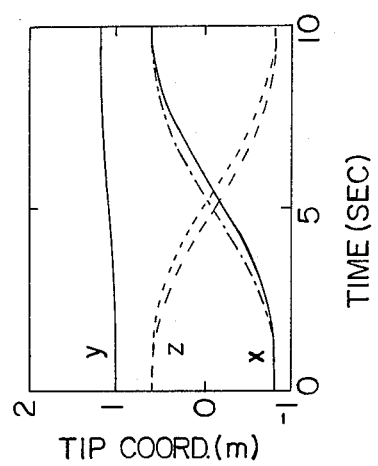
Figure 6C:
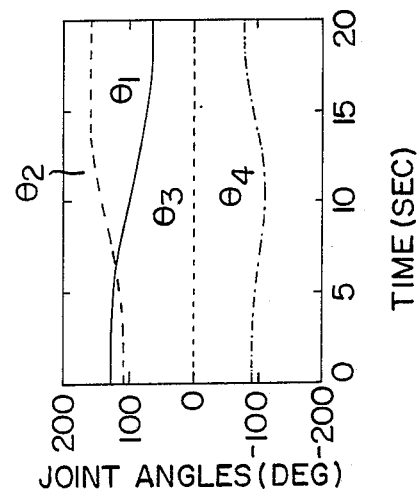
Figure 6B:
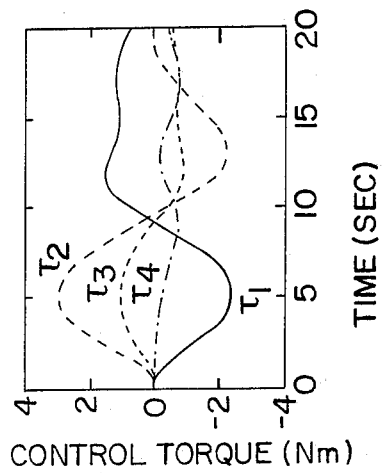
Figure 6A:
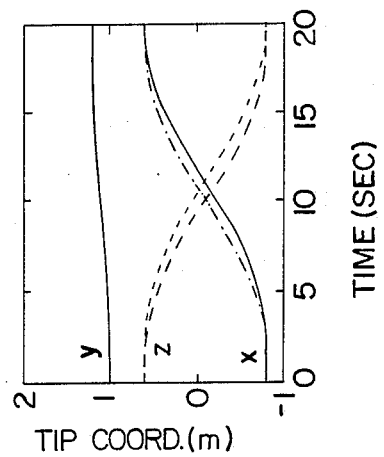

FIGS. 5a–5c show the same simulation except that the pseudo-inverse is used to generate the joint trajectory. Notice that $\theta_3$ attains a final angle of about 35 degrees in order to decrease the average velocity of the other three parameters. Otherwise, the performance is the same as before. FIGS. 6a–6c show the simulation of FIGS. 4a–4c except that a 100 kg payload has been added. Another simulation showed that the maximum control torque with this payload and a maneuver time of 10 sec is about 12 Nm. Therefore, using equation 14 and the fact that the previous simulations have maximum control torques of 3 Nm, the maneuver time was lengthened by a factor of 2 ($=\sqrt{12/3}$) to bring the maximum control torque back to 3 Nm. In addition, the closed-loop poles were reduced to 1.2 rad/sec to match the increase in maneuver time. The tracking performance is as good as that with no payload.

It is therefore to be realized that the present invention includes the inverse kinematics solution, a modal position control algorithm, and path planning results for a 4 degree of freedom manipulator arm. After arbitrarily choosing the elbow roll angle $\theta_3$, the redundant degree of freedom, the inverse kinematics has four solutions. Each solution corresponds to a different orientation of the links 12 and 14 in space.

A computationally simple modal position control algorithm has been developed which guarantees a nearly constant closed-loop dynamic response throughout the workspace. The algorithm consists of diagonalizing the mass matrix into four modal inertias and computing feedback gains to control the modal coordinates. This controller is able to reject the disturbance arising from the unmodeled velocity-squared terms. If all closed-loop poles are assigned to the same location, the algorithm can be implemented with very little computation. To further reduce the required computation, the modal gains are at discrete time intervals. An update frequency of every 5 degrees of either pitch angle $\theta_2$ or $\theta_4$ motion significantly reduces computation without degrading performance.

For commanding manipulator movements, a 5th-order spline with zero velocity and acceleration at the end points provides a smooth tip-space path. The frequencies of the closed-loop poles should be at least 4/T Hz, where T is the trajectory duration, to maintain adequate tracking. The best singularity avoidance scheme is keeping the tip trajectory in the region of complete orbit capability. The orbit angle can then be used to address other constraints such as obstacle avoidance or tip-space stiffness. A method is presented for modifying the trajectory duration when a payload is added to maintain a constant joint control torque. The payload should be modeled in the mass matrix to allow accurate control over the closed-loop bandwidth.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. An improved method for controlling the movement of a robotic arm from an initial position to a final position, comprising:
   constructing a robotic arm having a first link and a second link, each said link having a first end and a second end; said first link being joined to a fixed surface at said first end thereof by a shoulder joint having two rotational degrees of freedom, and said second link being joined at said first end thereof to said second end of said first link by an elbow joint having two rotational degrees of freedom;
   identifying three spatial displacement coordinates of said initial position of said second end of said second link;
   identifying three spatial coordinates of said final position for said second end of said second link;
   identifying initial values of said two rotational degrees of freedom of said shoulder joint;
   identifying initial values of said two rotational degrees of freedom of said elbow joint;
   identifying a redundant rotational degree of freedom in said arm;
   utilizing a constraint that said redundant degree of freedom is equal to a fixed value;
   determining final values of three remaining rotational degrees of freedom;
   utilizing an equation $$\tau_c = -[SK_pS^T \ SK_rS^T]\begin{Bmatrix} \theta \\ \dot{\theta} \end{Bmatrix}$$

wherein:
   $\tau_c$=joint control torque
   $K_p$=a diagonal matrix containing position gain information
   $K_r$=a diagonal matrix containing rate gain information
   S=a coordinate transformation matrix
   $S^T$=a transform of matrix S such that $S^TS=I$
   $\theta$=a vector of joint angles
   $\dot{\theta}$=rate of change of $\theta$
to determine the joint control torque of each rotational degree of freedom; and
   solving said equation to determine the joint control torque for each rotational degree of freedom, and providing signals to control said shoulder joint and said elbow joint such that said second end of said second link is directed from said initial position to said final position.

2. A method for controlling the movement of a robotic arm as described in claim 1 wherein said two rotational degrees of freedom of said shoulder joint are roll angle and pitch angle, and wherein said two rotational degrees of freedom of said elbow joint are roll angle and pitch angle.

3. A method for controlling the movement of a robotic arm as described in claim 2 wherein said redundant rotational degree of freedom is said roll angle of said elbow joint.

4. A method for controlling the movement of a robotic arm as described in claim 3 wherein the value of said roll angle of said elbow joint is constrained to equal zero degrees.

5. A method for controlling the movement of a robotic arm as described in claim 1, further including;
utilizing a mathematical spline to provide path solutions to plan the path of said second end of said second link.

6. A method for controlling the movement of a robotic arm as described in claim 5 wherein said spline is represented by an equation:

$$x(t) = x_i + \left( 6\left(\frac{t}{T}\right)^5 - 15\left(\frac{t}{T}\right)^4 + 10\left(\frac{t}{T}\right)^3 \right)(x_f - x_i),$$

wherein t is the actual time from the start of the maneuver, T is the total maneuver time, $x_i$ is a spatial coordinate of said initial position and $x_f$ is a spatial coordinate of said final position of said second end of said second link.

7. A method for controlling the movement of a robotic arm as described in claim 1 including updating said torque control values once for every five degrees of change of one of said shoulder joint pitch angle or elbow joint pitch angle parameters.

8. An improved method for controlling the movement of a robotic arm from an initial position to a final position, comprising:
constructing a robotic arm having a first link and a second link, each said link having a first end and a second end; said first link being joined to a fixed surface at said first end thereof by a shoulder joint having two rotational degrees of freedom, and said second link being joined at said first end thereof to said second end of said first link by an elbow joint having two rotational degrees of freedom;
identifying three spatial displacement coordinates of said initial position of said second end of said second link;
identifying three spatial coordinates of said final position for said second end of said second link;
identifying initial values of said two rotational degrees of freedom of said shoulder joint;
identifying initial values of said two rotational degrees of freedom of said elbow joint;
identifying a redundant rotational degree of freedom in said arm;
utilizing a constraint that said redundant degree of freedom is equal to a fixed value;
determining final values of the three remaining rotational degrees of freedom;
utilizing an equation $$\tau_c = -[M\omega^2 \; 2M\zeta\omega]\left\{ \begin{array}{c} \theta \\ \dot{\theta} \end{array} \right\}$$

wherein:
$\tau_c$ = joint control torque
M = mass matrix
$\omega$ = closed loop frequency
$\zeta$ = a damping constant
$\theta$ = a vector of joint angles
$\dot{\theta}$ = the rate of change of $\theta$
to determine a control torque of each rotational degree of freedom; and
solving said equation to determine the joint control torque for each rotational degree of freedom, and providing signals to control said shoulder joint and said elbow joint such that said second end of said second link is directed from said initial position to said final position.

9. A method for controlling the movement of a robotic arm as described in claim 8 wherein said two rotational degrees of freedom of said shoulder joint are roll angle and pitch angle, and wherein said two rotational degrees of freedom of said elbow joint are roll angle and pitch angle.

10. A method for controlling the movement of a robotic arm as described in claim 9 wherein said redundant rotational degree of freedom is said roll angle of said elbow joint.

11. A method for controlling the movement of a robotic arm as described in claim 10 wherein a value of said roll angle of said elbow joint is constrained to equal zero degrees.

12. A method for controlling the movement of a robotic arm as described in claim 8, further including;
utilizing a mathematical spline to provide path solutions to plan the path of said second end of said second link.

13. A method for controlling the movement of a robotic arm as described in claim 12 wherein said spline is represented by an equation:

$$x(t) = x_i + \left( 6\left(\frac{t}{T}\right)^5 - 15\left(\frac{t}{T}\right)^4 + 10\left(\frac{t}{T}\right)^3 \right)(x_f - x_i),$$

wherein t is an actual time from the start of the maneuver, T is a total maneuver time, $x_i$ is a spatial coordinate of said initial position and $x_f$ is a spatial coordinate of said final position of said second end of said second link.

14. A method for controlling the movement of a robotic arm as described in claim 8 including updating said torque control values once for every five degrees of change of one of said shoulder joint pitch angle or elbow joint pitch angle parameters.

15. An improved method for controlling the movement of a robotic arm from an initial position to a final position, comprising:
constructing a robotic arm having a first link and a second link, each said link having a first end and a second end; said first link being joined to a fixed surface at said first end thereof by a shoulder joint having two rotational degrees of freedom, and said second link being joined at said first end thereof to said second end of said first link by an elbow joint having two rotational degrees of freedom;

identifying three spatial displacement coordinates of said initial position of said second end of said second link;

identifying three spatial coordinates of said final position for said second end of said second link;

identifying initial values of said two rotational degrees of freedom of said shoulder joint;

identifying initial values of said two rotational degrees of freedom of said elbow joint;

utilizing a first equation $$\tau_c = -[SK_pS^T \; SK_rS^T]\begin{Bmatrix} \theta \\ \dot\theta \end{Bmatrix}$$

wherein:

$\tau_c$ = joint control torque
$K_p$ = a diagonal matrix containing position gain information
$K_r$ = a diagonal matrix containing rate gain information
$S$ = a coordinate transformation matrix
$S^T$ = a transform of matrix S such that $S^TS = I$
$\theta$ = a vector of joint angles
$\dot\theta$ = rate of change of $\theta$ to determine the joint control torque of each rotational degree of freedom;

utilizing a constraint that the velocities of said elbow joint rotational degrees of freedom and said shoulder joint rotational degrees of freedom be minimized; and determining the joint control torque for each rotational degree of freedom, and providing signals to control said shoulder joint and said elbow joint such that said second end of said second link is directed from said initial position to said final position.

16. A method for controlling the movement of a robotic arm as described in claim 13, further including determining said velocities
utilizing a second equation
$\dot\theta(t) = J^t\dot X(t)$, where $\dot X(t)$ is a vector of space tip coordinates and $J^t$ is a Jacobean pseudo inverse mathematical function.

17. A method for controlling the movement of a robotic arm as described in claim 16 wherein said two rotational degrees of freedom of said shoulder joint are roll angle and pitch angle, and wherein said two rotational degrees of freedom of said elbow joint are roll angle and pitch angle.

18. A method for controlling the movement of a robotic arm as described in claim 16, further including;
utilizing a mathematical spline to provide path solutions to plan the path of said second end of said second link.

19. A method for controlling the movement of a robotic arm as described in claim 18 wherein said spline is represented by an equation:

$$x(t) = x_i + \left(6\left(\frac{t}{T}\right)^5 - 15\left(\frac{t}{T}\right)^4 + 10\left(\frac{t}{T}\right)^3\right)(x_f - x_i),$$

wherein t is an actual time from the start of the maneuver, T is a total maneuver time, and $x_i$ is a spatial coordinate of said initial position and $x_f$ is a spatial coordinate of said final position of said second end of said second link.

20. A method for controlling the movement of a robotic arm as described in claim 16 including updating said torque control values once for every five degrees of change of one of said shoulder joint pitch angle or said elbow joint pitch angle parameters.

21. An improved method for controlling the movement of a robotic arm from an initial position to a final position, comprising:

constructing a robotic arm having a first link and a second link, each said link having a first end and a second end;

said first link being joined to a fixed surface at said first end thereof by a shoulder joint having two rotational degrees of freedom, and said second link being joined at said first end thereof to said second end of said first link by an elbow joint having two rotational degrees of freedom;

identifying the three spatial displacement coordinates of said initial position of said second end of said second link;

identifying three spatial coordinates of said final position for said second end of said second link;

identifying initial values of said two rotational degrees of freedom of said shoulder joint;

identifying initial values of said two rotational degrees of freedom of said elbow joint;

utilizing a first equation $$\tau_c = -[M\omega^2 \; 2M\zeta\omega]\begin{Bmatrix} \theta \\ \dot\theta \end{Bmatrix}$$

wherein:

$\tau_c$ = joint control torque
M = mass matrix
$\omega$ = closed loop frequency
$\zeta$ = a damping constant
$\theta$ = a vector of joint angles
$\dot\theta$ = rate of change of $\theta$ to determine the joint control torque of each rotational degree of freedom;

utilizing a constraint that the velocities of said elbow joint rotational degrees of freedom and said shoulder joint rotational degrees of freedom be minimized; and determining the joint control torque for each rotational degree of freedom, and providing signals to control said shoulder joint and said elbow joint such that said second end of said second link is directed from said initial position to said final position.

22. A method for controlling the movement of a robotic arm as described in claim 21, further including determining said velocities
utilizing a second equation
$\dot\theta(t) = J^t\dot X(t)$, where $\dot X(t)$ is a vector of space tip coordinates and $J^t$ is a Jacobean pseudo inverse mathematical function.

23. A method for controlling the movement of a robotic arm as described in claim 22 wherein said two rotational degrees of freedom of said shoulder joint are roll angle and pitch angle, and wherein said two rotational degrees of freedom of said elbow joint are roll angle and pitch angle.

24. A method for controlling the movement of a robotic arm as described in claim 23, further including;
   utilizing a mathematical spline to provide path solutions to plan the path of said second end of said second link.

25. A method for controlling the movement of a robotic arm as described in claim 24 wherein said spline is represented by an equation:

$$x(t) = x_i + \left(6\left(\frac{t}{T}\right)^5 - 15\left(\frac{t}{T}\right)^4 + 10\left(\frac{t}{T}\right)^3\right)(x_f - x_i),$$

wherein t is an actual time from the start of the maneuver, T is total maneuver time, $x_i$ is a spatial coordinate of said initial position and $x_f$ is a spatial coordinate of said final position of said second end of said second link.

26. A method for controlling the movement of a robotic arm as described in claim 22 including updating said joint torque control values once for every five degrees of change of one of said shoulder joint pitch angle or said elbow joint pitch angle parameters.

* * * * *